United States Patent Office 3,496,478
Patented Feb. 17, 1970

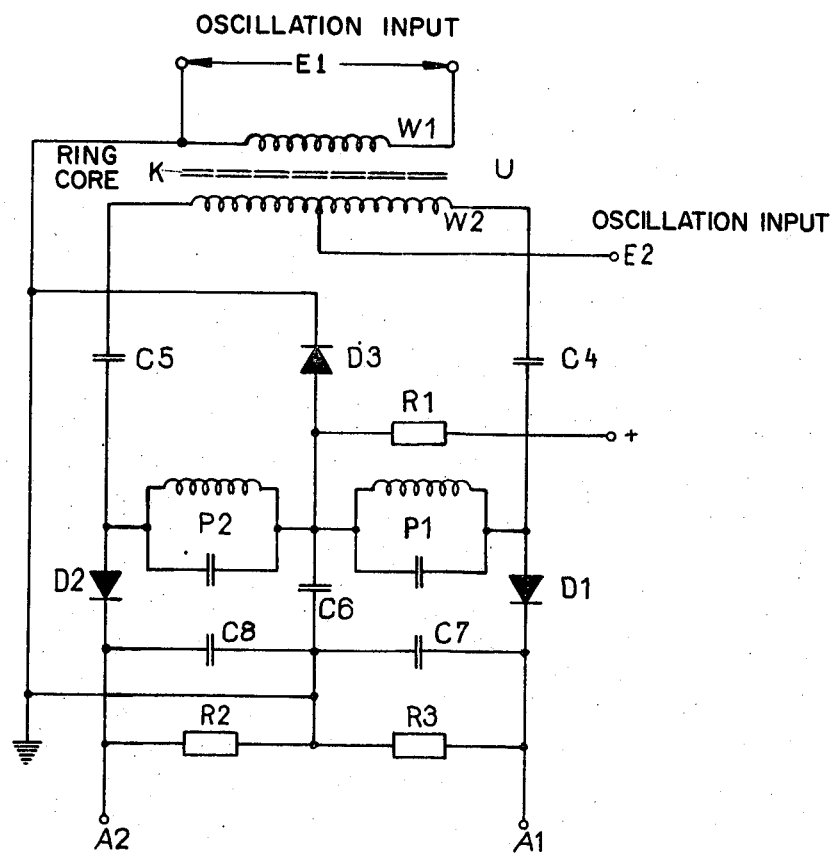

3,496,478
PHASE DISCRIMINATOR FOR TWO ELECTRICAL OSCILLATIONS OF THE SAME FREQUENCY
Peter F. Aemmer and Heinrich Diem, Zurich, Switzerland, assignors to Albiswerk Zurich A.G., Zurich, Switzerland
Filed July 19, 1966, Ser. No. 566,435
Claims priority, application Switzerland, Aug. 20, 1965, 11,719/65
Int. Cl. H03k 9/06; H03d 13/00
U.S. Cl. 328—133                        9 Claims

ABSTRACT OF THE DISCLOSURE

A phase discriminator for two electrical oscillations of the same frequency comprises a ring core transformer on which is wound a primary winding and a center-tapped secondary winding. One input oscillation frequency is applied to the primary winding, and the second input oscillation input frequency is applied to the center tap of the secondary winding. The end terminals of the secondary winding are each connected to a respective output terminal through a respective capacitatively loaded rectifier, and the input of each rectifier is shunted by a respective parallel resonant circuit tuned to the input signal frequency. Respective parallel capacitor and resistor combinations connect the output terminals to ground in a balanced manner.

BACKGROUND OF THE INVENTION

This invention relates to phase discriminators for discriminating between two electrical oscillations of the same frequency and, more particularly, to a novel and improved phase discriminator of the type in which one oscillation is applied to the primary winding of a transformer having a center-tapped secondary winding, with the other oscillation being applied to the center tap, and with the end terminals of the secondary winding each being connected to a respective capacitatively loaded rectifier.

An ideal phase discriminator is a circuit arrangement which, with an input voltage of the form $U_0 \cos(\omega t - \phi_0)$, delivers an output DC voltage of the form $kU_0 \cos \phi_0$. In technical applications it is intended to closely approximate this input to output relationship. However, in general, the output voltage of a technical phase discriminator has the form $k(U_0, \omega) \cos [\phi_0 + \Delta\phi(U_0, \omega)]$ with the amplitude factor $k(U_0, \omega)$ and the phase-difference term $\Delta\phi(U_0, \omega)$ depending on the signal amplitude $U_0$ and on the frequency $\omega$ instead of being constant.

A good approximation to the ideal relation as stated above has been attained for low frequency applications, such as, in a similar example, carrier telephone frequency down converters, by the use of balanced modulators followed by low-pass filters. In this technique it is required that the transformer, and also the rectifier circuit, are well balanced. Furthermore the rectifier circuit has to be an arrangement which provides true average response rectification and therefore has to be loaded by an impedance which is substantially resistive from DC to at least twice the frequency $\omega$.

Phase discriminators designed exclusively for high frequencies (about 10 mHz. and higher) cannot readily fulfill these conditions. Balancing of the transformer is very hard to attain due to the small number of turns of the windings, especially where iron or ferrite cores are used. In the case of air coils, there are difficulties with respect to good magnetic coupling and stray capacitances toward the center tap of the secondary winding and toward mass or ground.

To remove the ripple and possibly superposed high frequency, it is necessary to provide a filter arrangement following the rectifier. Due to stray capacitances, the rectifier is capacitatively loaded independently of the filter arrangement. Thereby, a kind of peak-responding rectification is effected. However, peak-response rectifiers draw current for short periods of time only, which causes a non-linear kind of loading of the entire preceding circuitry.

SUMMARY OF THE INVENTION

An object of the present invention is to provide a phase discriminator of the type mentioned and which is free of the disadvantages of prior art phase discriminators of this type.

Another object of the invention is to provide a phase discriminator of the type mentioned and in which the transformer includes a ring core.

A further object of the invention is to provide a phase discriminator of the type mentioned wherein, at the input of each rectifier, a respective parallel oscillating circuit is provided and is tuned to the frequency of the input voltage oscillations.

The provision of a ring core for the transformer provides for the secondary windings to be maintained substantially symmetrical. Since they are arranged on the only a negligibly small capacitative coupling from primary to secondary has to be take into account.

A considerable amount of oscillating energy is stored in the parallel oscillating circuits connected ahead of the respective rectifiers. Consequently, the non-linear loading by the rectifiers working on stray capacitances is smoothed out considerably by these energy reservoirs.

A further object of the invention is to provide a phase discriminator of the type mentioned in which each of the parallel oscillating circuits is connected to the transformer through a respective capacitor.

These capacitors, together with the stray inductances of the transformer having a ring core, provide series oscillating circuits. The parallel oscillating circuits, together with the series oscillating circuits, form band pass filters.

It frequently happens that the threshold voltage of the diodes has a disturbing effect on the rectification. Accordingly, a further object of the invention is to provide a phase discriminator of the type mentioned in which the diodes thereof have a forward voltage applied thereto and corresponding to the threshold voltage.

Another object of the invention is to provide a phase discriminator of the type mentioned, in which the diodes are biased by such a forward voltage, and wherein the parallel oscillating circuits are connected to a common point and from there to mass or ground through a common diode.

Yet a further object of the invention is to provide a phase discriminator of the type just-mentioned in which the last-named diode is biased by a current, whereby a voltage drop corresponding to the threshold voltage is applied to the rectifier diodes through the parallel oscillating circuits.

Another object of the invention is to provide a phase discriminator of the type just-mentioned in which the common connection of the two parallel oscillating circuits is connected to mass or ground, for alternating currents, by a capacitor bypassing the common diode.

For an understanding of the principles of the invention, reference is made to the following description of a typical embodiment thereof as illustrated in the accompanying drawing.

BRIEF DESCRIPTION OF THE DRAWINGS

In the drawing, the single figure is a schematic wiring diagram of a phase discriminator embodying the invention.

DESCRIPTION OF THE PREFERRED EMBODIMENT

Referring to the drawing, the phase discriminator includes a transformer U having a primary winding W1, a center-tapped secondary winding W2 and a ring or annular core K. Primary winding W1 of the transformer U has applied thereto a first oscillation which is applied at input E1.

Core K of transformer U is an annular or ring core to which the primary and secondary windings are applied separately. Secondary winding W2 comprise two equal halves, and the common point of these two equal halves, or the center-tap, has the second oscillation applied thereto from the input E2.

The end terminals of secondary winding W2 are connected to respective diodes D1 and D2 through respective capacitors C4, C5. The junction point or connection of each capacitor C4, C5 with its associated diode D1, D2 has connected thereto one terminal of a respective parallel oscillating circuit P1, P2. The other terminals of parallel oscillating circuits P1 and P2 are commonly connected to ground through a diode D3. A positive voltage is applied to the anode of diode D3 through a resistor R1. The common connection or junction point of the parallel oscillating circuits P1, P2 is also connected to ground through a capacitor C6, as a bypass to ground for alternating current. The cathodes of diodes D1 and D2 are connected to respective output terminals A1 and A2, and these output terminals are connected to mass or ground through parallel capacitors C7 and C8 and resistors R2, R3.

Transformer U must be driven at input E2 by a low ohmic source which provides a virtual ground for the stray capacitances from the primary winding and the end terminals of the secondary winding. A symmetrical magnetic coupling, and small stray capacitances between the primary and secondary windings, are obtained with the arrangement as described. Due to a mechanical arrangement balanced with respect to ground, transformer U can be made to have also a good capacitative balance with respect to ground.

That portion of the discriminator, shown in the drawings, comprising transformer U, diodes D1 and D2, capacitors C7 and C8 and resistors R2 and R3 is known per se except for the use of a ring core K for transformer U instead of the usual open iron core. The method of operation of such a discriminator is known to those skilled in the art and described in many publications and textbooks referring to demodulation of frequency-modulated oscillations.

Ring core K has the effect, since secondary winding W2 can be wound as two separate windings arranged side by side, that the mutual capacitative influence remains very small and the capacitative load of diodes D1 and D2 thus becomes lower. The remaining capacitative load, however, still is sufficient to assure rectification of the peak values. The thus obtained intermittent loading of the circuit feeding the discriminator is absorbed by the components in the parallel oscillatory circuit P1 and P2. These oscillatory circuits, acting as energy storage means, can give off the respective surge currents, so that the rectification, as seen from the transformer U, acts as if a strict rectification of mean values occurs.

As shown in the drawings, diodes D1 and D2 are connected through capacitors C4 and C5 with the transformer U. These capacitors, together with the stray inductance characteristic of every transformer, form series oscillatory circuits. Each of these circuits, when turned to the fundamental frequency by suitable selection of the respective capacitance, yields, together with the respective parallel oscillatory circuit P1, P2, a respective band pass filter, by means of which all harmonics and also interference effects with lower frequencies than the fundamental frequency are filtered out. Thus, diodes D1 and D2 are fed only with the oscillation to be processed.

What is claimed is:

1. A phase discriminator, for two electrical oscillations of the same frequency, comprising, in combination, a transformer including a ring core, a primary winding on said ring core and a center-tapped secondary winding on said ring core and having end terminals; a first input terminal connected to said primary winding and applying one oscillation thereto; a second input terminal connected to the center tap of said secondary winding and applying the other oscillation thereto; a pair of capacitatively loaded rectifiers each having an input, connected to a respective end terminal of said secondary winding, and an output connected to a respective output terminal; and respective parallel resonant circuits, each tuned to the input frequency, and each shunting the input of a respective rectifier.

2. A phase discriminator, as claimed in claim 1, including a pair of respective capacitors each connecting the input of a respective rectifier to a respective end terminal of said secondary winding.

3. A phase discriminator, as claimed in claim 2, in which each parallel resonant circuit has a respective first terminal connected to a respective end terminal of said secondary winding through a respective one of said capacitors.

4. A phase discriminator, as claimed in claim 3, in which the other terminals of said parallel resonant circuits are connected to a common point which is grounded.

5. A phase discriminator, as claimed in claim 4, including a diode connecting said common point to ground.

6. A phase discriminator, as claimed in claim 4, including means, including a source of unidirectional current, applying a bias potential to said diode in forward conductive direction.

7. A phase discriminator, as claimed in claim 4, including a capacitor connected between said common point and ground and in parallel with said diode.

8. A phase discriminator, as claimed in claim 7, including means, including a source of unidirectional current, applying a bias potential in forward conductive direction to said diode.

9. A phase discriminator, as claimed in claim 3, in which said rectifiers comprise diodes; and a pair of balanced parallel capacitor-resistor combinations, each connecting a respective output terminal to ground.

References Cited

UNITED STATES PATENTS

| 2,415,468 | 2/1947 | Webb | 329—137 |
| 2,647,207 | 7/1953 | Hawkins et al. | 328—133 |
| 2,976,409 | 3/1961 | Loughlin. | |
| 3,103,633 | 9/1963 | Hartog | 328—133 |
| 3,265,976 | 8/1966 | Broadhead | 328—134 XR |
| 3,391,345 | 7/1968 | Burgert | 307—232 XR |

FOREIGN PATENTS

| 653,703 | 5/1951 | Great Britain. |
| 865,076 | 4/1961 | Great Britain. |
| 1,244,494 | 9/1960 | France. |

JOHN S. HEYMAN, Primary Examiner

STANLEY T. KRAWCZEWICZ, Assistant Examiner

U.S. Cl. X.R.

307—232; 329—137